(12) United States Patent
Kagawa

(10) Patent No.: US 8,121,475 B2
(45) Date of Patent: Feb. 21, 2012

(54) OPTICAL SIGNAL QUALITY MONITOR FOR A HIGH-BIT RATE SIGNAL

(75) Inventor: Masatoshi Kagawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 794 days.

(21) Appl. No.: 12/216,878

(22) Filed: Jul. 11, 2008

(65) Prior Publication Data

US 2009/0016712 A1 Jan. 15, 2009

(30) Foreign Application Priority Data

Jul. 13, 2007 (JP) ................................ 2007-184608

(51) Int. Cl.
*H04B 10/08* (2006.01)
*H04J 14/02* (2006.01)
*G02B 6/00* (2006.01)
*G01B 9/02* (2006.01)

(52) U.S. Cl. .................. 398/9; 398/25; 398/26; 398/33; 356/477; 356/218; 356/459; 385/147; 385/11; 385/24

(58) Field of Classification Search ........................ 398/9
See application file for complete search history.

(56) References Cited

U.S. PATENT DOCUMENTS

| | | | | |
|---|---|---|---|---|
| 4,603,296 A | * | 7/1986 | Koo et al. | 324/244.1 |
| 5,017,006 A | * | 5/1991 | Poisel et al. | 356/218 |
| 5,309,535 A | * | 5/1994 | Bergano et al. | 385/38 |
| 5,396,166 A | * | 3/1995 | Vohra et al. | 324/96 |
| 6,943,931 B1 | * | 9/2005 | Dingel | 359/279 |
| 7,106,486 B1 | * | 9/2006 | Nahapetian et al. | 359/238 |
| 7,149,407 B1 | * | 12/2006 | Doerr et al. | 385/147 |
| 7,187,861 B2 | * | 3/2007 | Ruchet | 398/9 |
| 7,202,942 B2 | * | 4/2007 | Deines | 356/28.5 |

(Continued)

FOREIGN PATENT DOCUMENTS

JP  2005-151597  6/2005

OTHER PUBLICATIONS

U. K. Lize et al., "Simultaneous Monitoring of Chromatic Dispersion and PMD for OOK and DPSK Using Partial-Bit-Delay-Assisted Clock Tone Detection," in Proc. 32nd European Conf. On Opt. Commun. (ECOC2006). Mo 4. 4. 7. 2006.

*Primary Examiner* — Shi K Li
*Assistant Examiner* — Oomen Jacob
(74) *Attorney, Agent, or Firm* — Rabin & Berdo, P.C.

(57) ABSTRACT

An optical signal quality monitor includes a splitter splitting an input optical signal into two signals; a low-frequency converter converting one split optical signal to a low frequency signal by modulating the optical signal with a frequency offset signal; and an intensity ratio calculator calculating an intensity ratio between the low frequency signal and the other split optical signal, thereby appropriately confirming the quality of a high-bit rate optical signal. The monitor includes plural processing lines, each line including the splitter, the low-frequency converter, and the intensity ratio calculator. At least one line includes an optical noise superimposer superimposing optical noise on the one split signal before inputted to the converter or an optical band-pass filter transmitting the one split signal before inputted to the converter. The monitor includes a polarization state changer changing the polarization state of the input signal before inputted to the splitter.

7 Claims, 8 Drawing Sheets

U.S. PATENT DOCUMENTS

| | | | |
|---|---|---|---|
| 7,203,428 B2 * | 4/2007 | Waarts et al. | 398/204 |
| 7,512,336 B1 * | 3/2009 | Meli et al. | 398/17 |
| 7,627,200 B2 * | 12/2009 | Shiraishi et al. | 385/2 |
| 7,680,412 B2 * | 3/2010 | Anderson et al. | 398/26 |
| 7,877,010 B2 * | 1/2011 | Kagawa | 398/29 |
| 2001/0052981 A1 * | 12/2001 | Chung et al. | 356/364 |
| 2002/0001115 A1 * | 1/2002 | Ishida et al. | 359/180 |
| 2002/0149780 A1 * | 10/2002 | Trinh | 356/477 |
| 2002/0149814 A1 * | 10/2002 | Sorin | 359/110 |
| 2003/0090755 A1 * | 5/2003 | Chung et al. | 359/110 |
| 2004/0114923 A1 * | 6/2004 | Chung et al. | 398/26 |
| 2004/0156632 A1 * | 8/2004 | Lee et al. | 398/26 |
| 2004/0161243 A1 * | 8/2004 | Ooi et al. | 398/152 |
| 2004/0246466 A1 * | 12/2004 | Hunsche | 356/73.1 |
| 2005/0285790 A1 * | 12/2005 | Gagnon | 342/457 |
| 2006/0133712 A1 * | 6/2006 | Jang et al. | 385/1 |
| 2007/0009259 A1 * | 1/2007 | Dragovic et al. | 398/27 |
| 2008/0152361 A1 * | 6/2008 | Chen et al. | 398/205 |
| 2009/0092350 A1 * | 4/2009 | Gill | 385/3 |
| 2010/0129074 A1 * | 5/2010 | Gariepy et al. | 398/26 |
| 2010/0329677 A1 * | 12/2010 | Kaneda et al. | 398/65 |

* cited by examiner

//OPTICAL SIGNAL QUALITY MONITOR FOR A HIGH-BIT RATE SIGNAL

BACKGROUND OF THE INVENTION

1. Field of the Invention

The present invention relates to an optical signal quality monitor for monitoring, for example, a signal-to-noise ratio, polarization mode dispersion or the like of an optical signal in an optical transmission system.

2. Description of the Background Art

When investigating the quality or deterioration factor of a transmitted signal, an estimate of the quality or factor may require the waveform of the signal to be monitored.

The waveform of an optical signal may be monitored by using devices such as a sampling oscilloscope. Generally, the sampling oscilloscope is however a complicated and expensive device. As opposed to such a device, there is also a proposal for monitoring the quality of an optical signal without using the sampling oscilloscope.

Japanese patent laid-open publication No. 2005-151597 discloses an optical signal quality monitor that samples an optical signal to be measured having a predetermined bit rate by using an asynchronous timing clock, and uses the resulting histogram to determine the signal-to-noise ratio coefficient Q. This monitor scheme can obtain information on the signal waveform in a short time and configure a monitoring device relatively easily.

U. K. Lize et al., "Simultaneous Monitoring of Chromatic Dispersion and PMD for OOK and DPSK Using Partial-Bit-Delay-Assisted Clock Tone Detection" Proc. 31st European Conf. on Opt. Commun. (ECOC2003) Mo4. 4 Jul. 2006 proposes that it is possible to detect a frequency component having high intensity from an optical signal and use the frequency component to detect polarization mode dispersion (PMD) and chromatic dispersion.

However, the monitoring method of the optical waveform taught by the above-mentioned Japanese '597 patent publication is subject to a difficulty that the higher bit rate of the optical signal to be observed the fewer sampling points, thus rendering it difficult to analyze the signal.

The above-mentioned U. K. Lize, et al., discloses the measuring method of detecting the frequency component corresponding to the bit rate of an optical signal, thus also confronting the difficulty in analyzing the higher-bit rate signal.

Recently, an optical transmission system for transmitting and receiving an RZ (Return-to-Zero) optical signal of a 160 Gbps bit rate has been researched and developed. However, the methods taught by the above-mentioned Japanese '597 patent publication and U. K. Lize, et al., may not be satisfactory to such a high-bit rate optical signal.

SUMMARY OF THE INVENTION

It is therefore an object of the present invention to provide an optical signal quality monitoring device that may confirm appropriately the quality of a high-bit rate optical signal.

In accordance with the present invention, an optical signal quality monitor includes a splitter that splits an input optical signal into two split signals; a low-frequency converter that converts one of the split optical signals to a low frequency signal by modulating the optical signal with a frequency offset signal; and an intensity ratio calculator that calculates an intensity ratio between the low frequency signal and the other split optical signal as a reference.

In accordance with the present invention, it is therefore possible to confirm appropriately the quality of even the high-bit rate optical signal.

BRIEF DESCRIPTION OF THE DRAWINGS

The objects and features of the present invention will become more apparent from consideration of the following detailed description taken inconjunction with the accompanying drawings in which.

DESCRIPTION OF THE PREFERRED EMBODIMENTS

Figure 1:
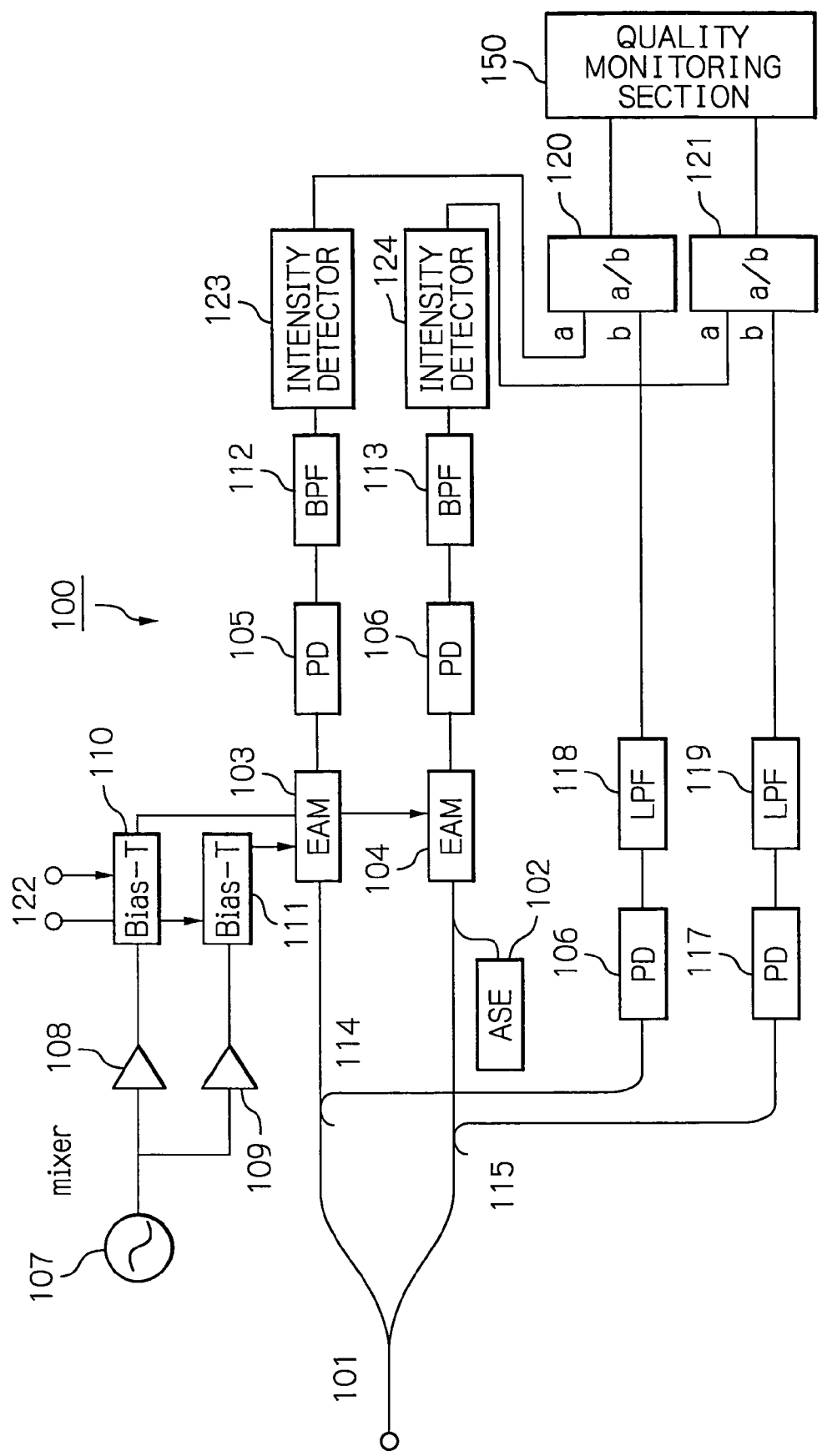
FIG. 1 is a schematic block diagram showing a first embodiment of an optical signal quality monitor according to the present invention.

With reference to the accompanying drawings, illustrative embodiments of an optical signal quality monitor according to the present invention will be described below. First, reference is made to FIG. 1, which is a schematic block diagram showing a first embodiment of an optical signal quality monitor 100. As shown in the figure, the optical signal quality monitor 100 includes constituent elements dealing with an optical signal and ones dealing with an electrical signal as well as a quality monitoring section 150.

The elements dealing with an optical signal are an optical splitter 101, an amplified spontaneous emission (ASE) generator 102, two electro-absorption (EA) modulators 103 and 104, four photo diodes (PD) 105, 106, 116 and 117, and two optical distributors 114 and 115, which are interconnected as illustrated. In the figure, optical connections are depicted with thick lines. The elements dealing with an electrical signal are a local oscillator 107, two drivers 108 and 109, two bias-Ts 110 and 111, a bias drive voltage source 122, two bandpass filters (BPF) 112 and 113, two low-pass filters (LPF) 118 and 119, two dividers 120 and 121, and two intensity detectors 123 and 124, which are interconnected as depicted. Electrical connections are shown with thin lines in the figure.

The optical splitter 101 is adapted to split the input optical signal into two signals. For example, a received optical signal or an optical signal to be transmitted in an optical transmission system is split as an input optical signal to the optical splitter 101. The input optical signal may be, for example, an RZ (Return-to-Zero) optical signal of a bit rate of 160 Gbps.

The optical signal quality monitor 100 in the first embodiment includes a couple of lines or systems, each of which deals with corresponding one of the signals associated with the two split optical signals provided by the optical splitter 101. One line may hereinafter be referred to as the "first line" and the other the "second line". Elements in the first or second line may be called by putting the word "first" or "second" before their name respectively. The two lines have the same configuration except that the second line includes the ASE generator 102. That is to say, the first line consists of the EA modulator 103, the photo diode 105, the band filter 112, the intensity detector 123, the photo diode 116, the low-pass filter 118, and the divider 120. Similarly, the second line consists of the EA modulator 104, the photo diode 106, the band filter 113, the intensity detector 124, the photo diode 117, the low-pass filter 119, and the divider 121, as well as the EA modulator 103.

The first and second lines include the optical distributors 114 and 115, respectively. Each distributor is adapted to separate the split optical signal provided from the optical splitter 101 further into two signals. It is noted that the optical splitter 101 may split the optical input signal into two signals, for example, equally, i.e. in the ratio of 1:1. The optical distributors 114 and 115 may however distribute the optical signal in a ratio other than 1:1 so long as the distributors, 114 and 115 are configured to distribute the signal in the same ratio as each other. The optical distributors 114 and 115 may be, for example, a directional optical coupler.

The ASE generator 102 is provided as an optical noise generator for generating an optical noise, such as a broad-spectrum light. The generator 102 is adapted to generate and output the amplified spontaneous emission (ASE) as the broad-spectrum light (optical noise). The generated ASE is superimposed on the split optical signal from the second optical distributor 115. The resultant optical signal of the distributor 115 is provided to the second EA modulator 104. The ASE generator 102 may be configured, for example, by including an erbium-doped fiber amplifier (EDFA).

The local oscillator 107 provided in common to the two lines is adapted to oscillate a signal at 40 GHz-$\Delta f/4$ Hz and provide the oscillation signal to the modulator drivers 108 and 109. The modulator drivers 108 and 109 in the respective lines are adapted to amplify the local oscillation signal. The bias drive voltage source 122 also provided in common to the two lines is adapted to supply a bias drive voltage Vb to the bias-Ts 110 and 111 included in the respective lines. The bias-Ts 110 and 111 in the respective lines are adapted to add negative voltages to the local oscillation signals amplified by the modulator drivers 108 and 109, respectively, and then, to input the resultant signals to the control terminals (bias input terminals) of the EA modulators 103 and 104, respectively.

The EA modulators 103 and 104 in the respective lines are adapted to obtain optical signals (beat signals) having a beat component $\Delta f$, e.g. of 1 GHz, between the optical signals from the optical distributors 114 and 115, respectively, and signals applied to the bias input terminals. The modulators 103 and 104 are also adapted to provide the beat signals to the photo diodes 105 and 106, respectively.

The photo diodes 105 and 106 in the respective lines are adapted to photoelectrically convert the beat signals from the EA modulators 103 and 104, respectively, to corresponding electric signals. The filters 112 and 113 in the respective lines are adapted to filter, i.e. remove the unnecessary components of, the beat components $\Delta f$ included in the electrical signals converted from the beat signals, respectively. The intensity detectors 123 and 124 in the respective lines are adapted to detect the intensity of the filtered electrical signals and provide the resultant intensity values to the dividers 120 and 121, respectively.

The photo diodes 116 and 117 in the respective lines are adapted to photoelectrically convert the input optical signals from the optical distributors 114 and 115, respectively, to corresponding electric signals. The low-pass filters 118 and 119 in the respective lines are adapted to filter the low-frequency components, including the necessary components of the input optical signals, in the converted electrical signals, corresponding to the respective input optical signals, from the diodes 116 and 117, respectively. The filters 118 and 119 are also adapted to provide the filtered electrical signals to the dividers 120 and 121, respectively. On each of the paths from the low-pass filters 118 and 119 to the dividers 120 and 121, respectively, is provided a device serving as the intensity detector. Those devices are however omitted from FIG. 1 because they are in practice simple resistors.

The dividers 120 and 121 in the respective lines are adapted to divide the detection signals (a) from the intensity detectors 123 and 124 by the filtering signals (b) from the low-pass filters 118 and 119, respectively. Although omitted from FIG. 1, an element such as a delay device may be provided before the divider 120 and/or 121 to achieve the same processing-delay before the divider 120 and/or 121. This allows the set of two signals, the set being provided by the optical distributor 114 and/or 115, to concurrently have an effect on the dividends and the divisors in the divider 120 and/or 121.

The quality monitoring section 150 is adapted to obtain a monitoring result of the quality of the input optical signal on the basis of the division results of the divider 120 and/or 121. The quality monitoring section 150 may be, for example, a personal computer incorporating desired software, such as quality monitoring program. The processing of the quality monitoring section 150 will be described in more detail in connection with the description of the operations below.

Now, the operation of the optical signal quality monitor 100 of the first embodiment will be described as an example of monitoring the quality of an optical signal. The optical signal quality monitor 100 according to the first embodiment receives an RZ optical signal of a bit rate of 160 Gbps. The input RZ optical signal is split into two signals by the optical splitter 101 to be forwarded to the corresponding lines. Each split optical signal is additionally divided into two signals by the optical distributor 114 or 115 in the corresponding line.

One of the optical signals distributed by the one optical distributor 115 in the second line is superimposed with the ASE generated by the ASE generator 102. In turn, the resultant optical signal from the ASE superimposition enters the EA modulator 104. One of the optical signals distributed by the other optical distributor 114 in the first line directly enters the EA modulator 103.

The oscillation signal of 40 GHz-Δf/4 Hz is outputted from the local oscillator 107 to the two lines and amplified by the respective modulator drivers 108 and 109. The amplified signals are applied with a negative voltage by the bias-Ts 110 and 111 and then fed to the EA modulators 103 and 104 in the respective lines.

Thus, in the respective lines, the beat signals of Δf are outputted from the EA modulators 103 and 104 and converted to electrical signals by the respective photo diodes 105 and 106. The converted electrical signals pass through the respective narrow band filters 112 and 113 having the passband center frequency of Δf and then are fed to the intensity detectors 123 and 124 in the respective lines. The detectors 123 and 124 detect the intensities of the Δf (Hz) components of the electrical signals to feed the detected intensity signals to the dividers 120 and 121, respectively.

Furthermore, the other split optical signals in the distributors 114 and 115 are outputted to the photo diodes 116 and 117 and then converted to electrical signals by the diodes 116 and 117, respectively. The converted electrical signals pass through the low-pass filters 118 and 119 to remove the unnecessary components therefrom. The filtered electrical signals then enter the dividers 120 and 121, respectively.

In the dividers 120 and 121, the detection signals (a) from the intensity detectors 123 and 124 are divided by the filtering signals (b) from the low-pass filters 118 and 119, in the respective lines. Both of the two division signals are then fed to the quality monitoring section 150.

Figure 2:
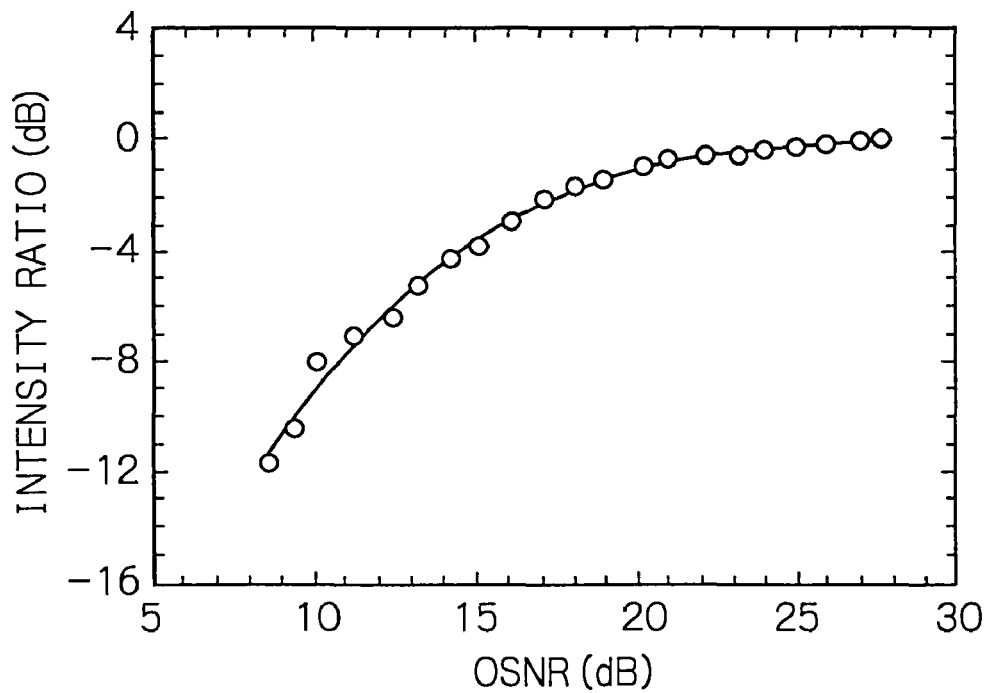
FIG. 2 is a graph plotting a curve showing the relationship between the OSNR (Optical Signal-to-Noise Ratio) of an input optical signal and an output division signal from a divider in a no-noise-superimposed line in the first embodiment.

FIG. 2 is a graph plotting the division signal a/b (Intensity Ratio) from the divider 120 with respect to the optical signal-to-noise ratio (OSNR) of the input optical signal to show a characteristic curve of the signal a/b.

The input a to the divider 120 (the output from the intensity detector 123) has a frequency limited within the frequency band of the beat signal. Regardless of the OSNR of the input optical signal, therefore, the input a is not generally affected by the noise. The input b to the divider 120 (the output from the low-pass filter 118) includes a frequency lower than the necessary frequency band for the input optical signal. The OSNR of the input optical signal, therefore, only has to be small enough to reduce the effect from the noise sufficiently. Outside the range, the OCNR may take a large value depending on the noise. With reference to FIG. 2, therefore, the division signal a/b from the divider 120 decreases as the OSNR of the input optical signal degrades.

Figure 3:
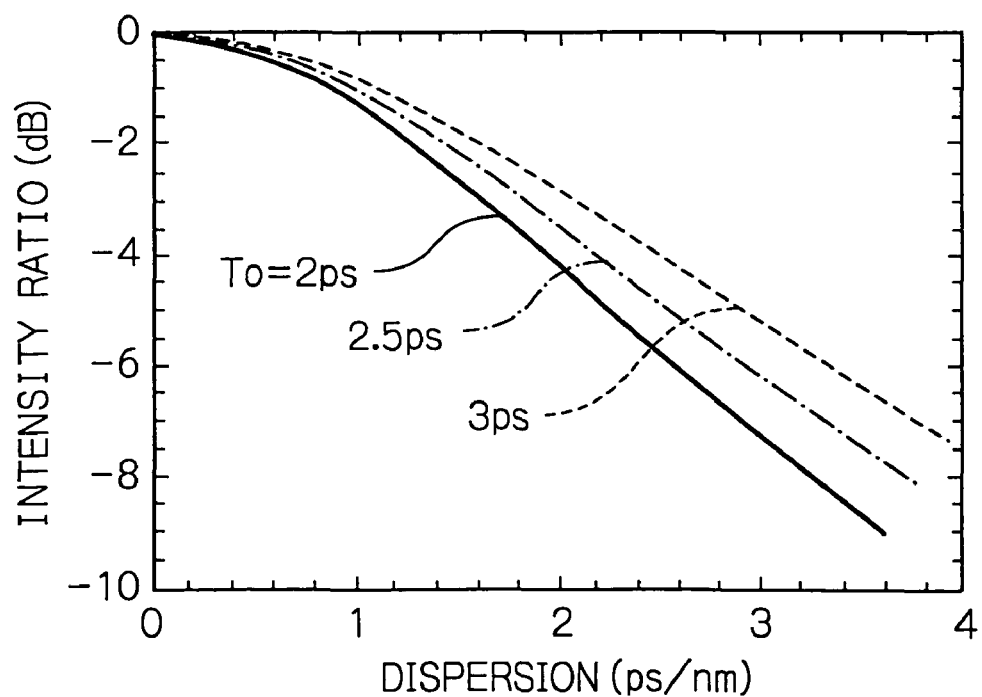
FIG. 3 is a graph plotting curves showing the relationship between the chromatic dispersion and the output division signal of the no-noise-superimposed line in the first embodiment.

FIG. 3 is a graph plotting the division signal a/b (Intensity Ratio) from the divider 120 with respect to the chromatic dispersion (Dispersion) of the input optical signal to show a characteristic curve of the signal a/b. In FIG. 3, a parameter To defines the initial pulse. The pulse width or duration of the initial pulse has an intensity of 1/e for no dispersion. It is assumed here that the pulse is a Gaussian pulse without chirp.

When the chromatic dispersion distorts the waveform of the input signal, the power of the input signal at the desired frequency decreases. In other words, the input a to the divider 120 (the output from the intensity detector 123) decreases in comparison to the input b to the divider 120 (the output from the low-pass filter 118). The division signal a/b thus decreases. Because the division signal a/b decreases in correspondence with variation of the wavelength or waveform of the input signal, when the chromatic dispersion is constant, the division signal a/b remains constant even if the OSNR of the input optical signal changes.

As has been discussed above, the division signal a/b from the divider 120 is processed in the first line without superimposing the noise on the signal a/b. In the same manner, a division signal a/b from the divider 121 is also processed in the second line with superimposing the noise on the signal a/b. Particularly, in the second line, the noise is superimposed on the signal a/b. Because the division signal a/b from the divider 121 is superimposed with noise (ASE from the ASE generator 102), the signal a/b from the divider 121 starts to decrease at a smaller OSNR than the signal a/b from the divider 120 in correspondence with a degree of the superimposition.

Figure 4:
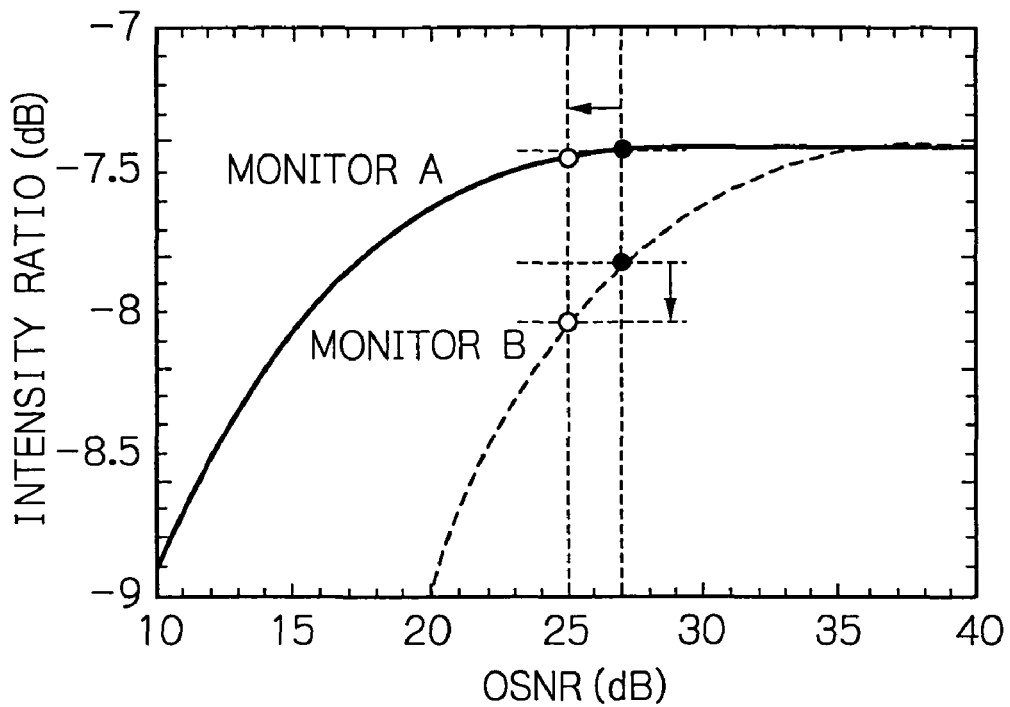
FIG. 4 is a graph plotting curves showing the relationship between the OSNR of the input optical signal and the output division signals of the no-noise-superimposed and noise-superimposed lines in the first embodiment.

FIG. 4 is a graph plotting the division signal a/b from the divider 120 in the first line ("Monitor A" in the figure) and the division signal a/b from the divider 121 in the second line ("Monitor B" also in the figure) in relation to the optical signal-to-noise ratio (OSNR) of the input optical signal to show the characteristic curves of both the signals a/b.

According to FIG. 4, since, in the second line, the ASE generator 102 adds noise (ASE) to the signal, the division signal a/b from the divider 121 in the second line starts to decrease at approximately 35 dB of the OSNR of the input optical signal. By contrast, since, in the first line, no noise is added to the signal, the division signal a/b from the divider 120 in the first line starts to decrease at approximately 25 dB of the OSNR of the input optical signal. For instance, when the OSNR of the input optical signal degrades from 27 dB to 25 dB, the division signal a/b from the divider 120 in the first line decreases little, whereas the division signal a/b from the divider 121 in the second line decreases by 0.2 dB.

Figure 5:
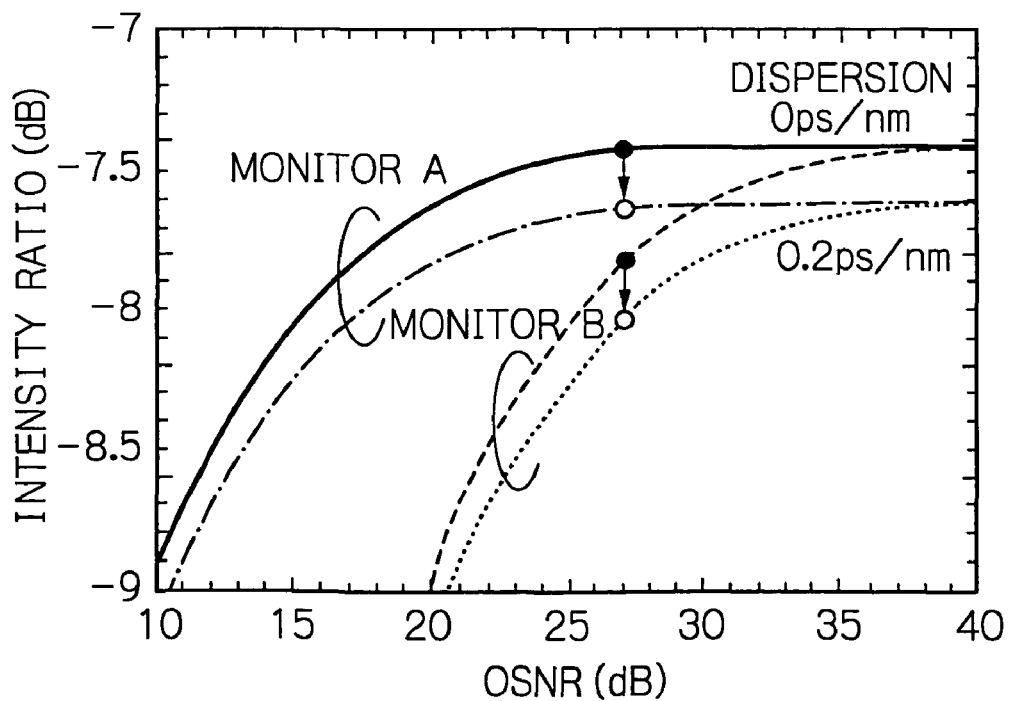
FIG. 5 is a graph plotting curves showing the relationship between the OSNR of the input optical signal and the output division signals of the no-noise-superimposed and noise-superimposed lines with respect to a chromatic dispersion in the first embodiment.

FIG. 5 is a graph plotting the division signal a/b from the divider 120 in the first line ("Monitor A" in the figure) and the division signal a/b from the divider 121 in the second line ("Monitor B" also in the figure) in relation to the OSNR of the input optical signal so as to show the characteristic curves of both the signals a/b with and without chromatic dispersion.

On the other hand, as seen in FIG. 3, the division signal a/b decreases with a regular inclination regardless of the OSNR in either case of the division signal a/b (Monitor A in FIG. 5) from the divider 120 in the first line and the division signal a/b (Monitor B in FIG. 5) from the divider 121 in the second line. With reference to FIG. 5, therefore, when the chromatic dispersion changes from no dispersion (0 ps/nm) to some dispersion (0.2 ps/nm, for example, in FIG. 5), the decrease in the division signal a/b (Monitor A) from the divider 120 in the first line is the same as the decrease in the division signal a/b (Monitor B) from the divider 121 in the second line.

As described above, the two detection signals, i.e. the division, signals show different variations when the OSNR degrades, but show the same variation when the chromatic dispersion distorts the waveform of the input signal. The waveform distortion caused by the OSNR degradation may thus be distinguished in observation from the waveform distortion caused by the chromatic dispersion.

The first and second line dividers 120 and 121 may output the division signals a/b (Monitor A and Monitor B) to a display device (the quality monitoring section 150 in this embodiment) that displays the division signals, by which the observers may determine the quality of the input optical signal. As the background of the display, it is preferable to show the characteristic curves at the display device as shown in FIGS. 2, 4, and 5 obtained in advance on the optical transmission system so as to facilitate the determination of the quality of the input optical signal by the observer.

The quality monitoring section 150 may incorporate some functions of determining the signal quality. For example, the quality monitoring portion 150 may be achieved as a personal computer incorporated desired software or a quality monitoring program sequence for executing the determination functions. In the software, the characteristic curve information as shown in FIGS. 2, 4, and 5 may be obtained in advance on the target optical transmission system to be stored in a database. In the subsequent observation, the division signals a/b (Monitor A and Monitor B) of the first and second line dividers 120 and 121 may be checked against the stored characteristic curve information to obtain the value of a desired quality parameter, such as OSNR. For example, when information on the characteristic curve as shown in FIG. 4 is stored and used, the quality monitoring section 150 outputs the OSNR of 25 dB for the Monitor A of −7.5 dB and the Monitor B of −8.05 dB, or the OSNR of 27 dB for the Monitor A of −7.5 dB and the Monitor B of −7.8 dB.

The observers or the software may store suitably the information on the characteristic curve in correspondence with the observation environment and the observation target.

For example, in the optical transmission system for receiving an optical signal with the chromatic dispersion generally fixed or hardly varying, when the observed center of the ONSR is generally constant and varies slightly, it is sufficient to store only the characteristic curve information shown in FIG. 2. For instance, in case where the observed center of the ONSR is 15 dB and has a variation of 10 to 20 dB, the observers or the software may store and process the characteristic curve information as shown in FIG. 2 only which is obtained by observing in advance the division signal a/b (Monitor A in FIG. 4) from the divider 120 in the first line. By contrast, in case where the observed center of the ONSR is of an appropriate value, the observers or the software may store and process the characteristic curve information only which is obtained by observing in advance the division signal a/b (Monitor B in FIG. 4) from the divider 121 in the second line.

Alternatively, in the optical transmission system for receiving an optical signal with the chromatic dispersion generally fixed or hardly varying, when the observed center of the ONSR is generally constant and varies considerably, it is also possible to store the characteristic curve information as shown in FIG. 4. For instance, in case where the observed center of the ONSR is 22 dB and has a variation of 15 to 30 dB, the observers or the software may store and process the characteristic curve information shown in FIG. 4 which is obtained by observing in advance the division signal a/b from the divider 120 in the first line (Monitor A) and the division signal a/b from the divider 121 in the second line (Monitor B). In this case, for example, if the ONSR is around 15 dB, the characteristic curve of the Monitor A is used to determine the observation, but if the ONSR is around 30 dB, the characteristic curve of the Monitor B is used to determine the observation.

Furthermore, in the optical transmission system for receiving an optical signal with the chromatic dispersion which varies, it is possible to store the characteristic curve information as shown in FIG. 5. For instance, when the observation of the division signal a/b (Monitor A) from the divider 120 in the first line is −7.8 dB, a combination of the chromatic dispersion and the OSNR cannot be fixed because such a combination may be the chromatic dispersion of 0 ps/nm and the OSNR of 17 dB, or the chromatic dispersion of 0.2 ps/nm, and the OSNR of 20 dB. However, if the information on the observation of the division signal a/b (Monitor B) from the divider 121 in the second line may be used, it is possible to determine a combination of the chromatic dispersion and the OSNR.

Thus, according to the first embodiment, the input optical signal is split into two signals, one of the split optical signals is modulated with a signal as offset to thereby be converted to a low frequency signal, and the ratio of the low frequency signal intensity to the other split optical signal intensity is used to monitor the waveform quality of the input optical signal. It is thus possible to appropriately confirm the quality of even the high-bit rate optical signal.

In addition, the two split signals may be monitored in such a couple of lines, and the signal in one line is superimposed with noise. The two signals may thus be monitored in the different ranges in respective lines, thereby distinguishing the signal quality in a wide range.

Moreover, by using the two lines, the OSNR may be detected regardless of the variation of the chromatic dispersion.

Figure 6:
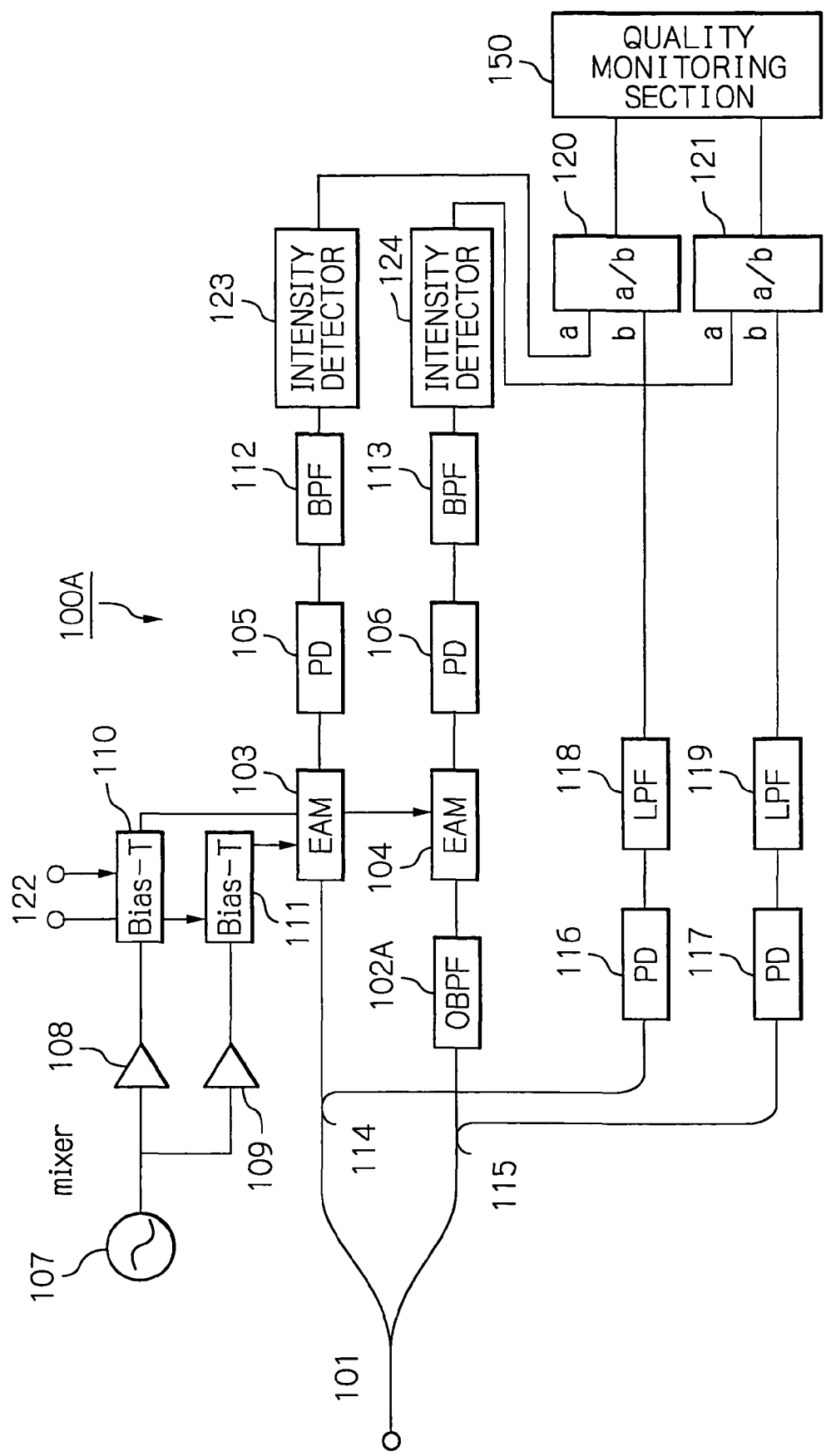
FIG. 6 is a schematic block diagram, like FIG. 1, showing a second embodiment of an optical signal quality monitor according to the present invention.

With reference further to the accompanying drawings, a description will now be given of an optical signal quality monitor according to an alternative, second embodiment of the present invention. FIG. 6 is a schematic block diagram of the configuration of an optical signal quality monitor 100A according to the second embodiment. The optical signal quality monitor 100A replaces the ASE generator 102 in the first embodiment with an optical band-pass filter (OBPF) 102A. The optical band-pass filter 102A may be inserted between the optical distributor 115 and the EA modulator 104 in the second line. The remaining constituent elements may be the same as in the first embodiment, and like components are designated with the same reference numerals.

Figure 7:
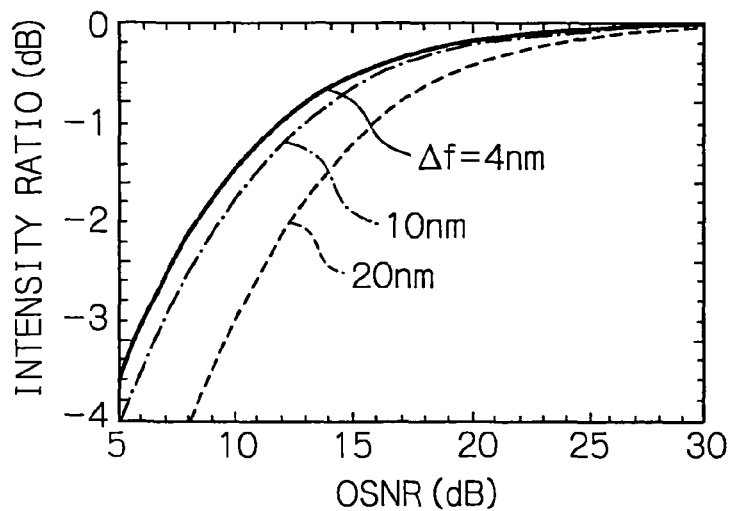
FIG. 7 is a graph plotting curves showing the relationship between the OSNR of the input optical signal and an output division signal from a divider of a system including an optical band-pass filter in the second embodiment.

With reference to FIG. 7, a description will be given on why the optical band-pass filter 102A is used in the optical signal quality monitor 100A in the second embodiment. The graph shown in FIG. 7 plots the division signal a/b (Power decrease) from the divider 121 in the second line including the optical band-pass filter 102A with respect to the optical signal-to-noise ratio (OSNR) of the input optical signal to show a characteristic curve of the signal a/b.

As seen in FIG. 7, when using the optical band-pass filter 102A to receive the signal of 3 dB and then pass the frequency of band width $\Delta f$ therethrough, it is possible to provide different intensity ratios a/b for the same OSNR depending on the band width. In other words, by suitably selecting the band width $\Delta f$ of the optical band-pass filter 102A in inputting the 3 dB signal, it is possible to accurately detect the OSNR that could not be accurately detected only using the division signal a/b from the divider 120 in the first line, by referring to the division signal a/b from the divider 121 in the second line.

For example, the band width $\Delta f$ for the 3 dB signal of the optical band-pass filter 102A may be selected to handle the characteristic curves shown in FIG. 7 like the characteristic curve of the Monitor B in FIG. 4.

The second embodiment may have advantages similar to those in the first embodiment. The second embodiment may additionally provide the different intensity depending on the variation of the OSNR without using the ASE generator 102 that requires power.

Figure 8:
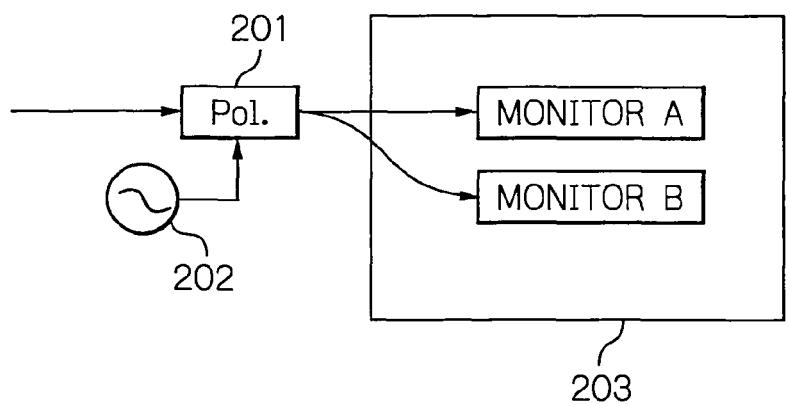
FIG. 8 is a schematic block diagram showing a third embodiment of an optical signal quality monitor according to the present invention.

With reference further to the accompanying drawings, a description will be now given of an optical signal quality monitor according to another alternative, third embodiment of the present invention. FIG. 8 is a schematic block diagram of the configuration of an optical signal quality monitor 100B according to the third embodiment. The optical signal quality monitor 100B includes a monitoring device 203 that has a similar configuration to the optical signal quality monitor 100 or 100A in the first or second embodiment, a polarizer 201 rotatably provided on the input side of the monitoring device 203, and an oscillator 202 that outputs an oscillation signal, for example, a signal with a frequency of 10 Hz or less, to rotate the polarizer 201 at a predetermined speed.

Figure 9:
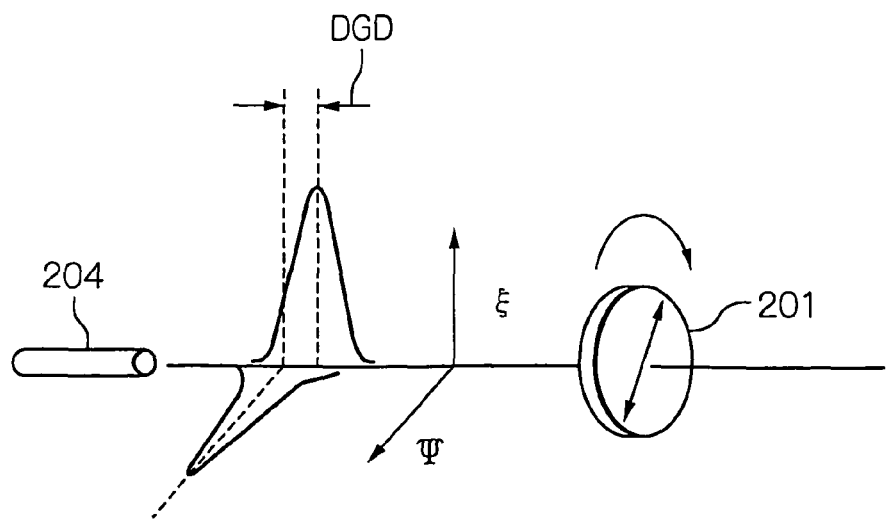
FIG. 9 is an explanatory diagram useful for understanding a differential group delay (DGD) used in the monitor in the third embodiment.

With reference to FIG. 9, the primary polarization mode dispersion (PMD) is generally expressed by a differential group delay (DGD) generated between a given xi ($\xi$) axis component and another psi ($\psi$) axis component perpendicular to the $\xi$ axis in the optical signal received from an optical fiber 204. According to the third embodiment, the waveform distortion due to the DGD may be detected. As shown in FIG. 9, the input light has a delay difference caused by the DGD between the given $\xi$ axis component and the other $\psi$ axis component perpendicular to the $\xi$ axis.

The polarizer 201 is adopted to polarize the input optical signal and to provide the resultant polarized signal to the monitoring device 203. The polarizer 201 rotates in response to a sinusoidal wave signal at a low frequency (here 10 Hz) generated by the oscillator 202. When the polarization axis of the polarizer 201 is parallel with the $\xi$ axis or the $\psi$ axis, the monitoring device 203 detects the same pulse shape as the transmitted waveform.

Figure 10:
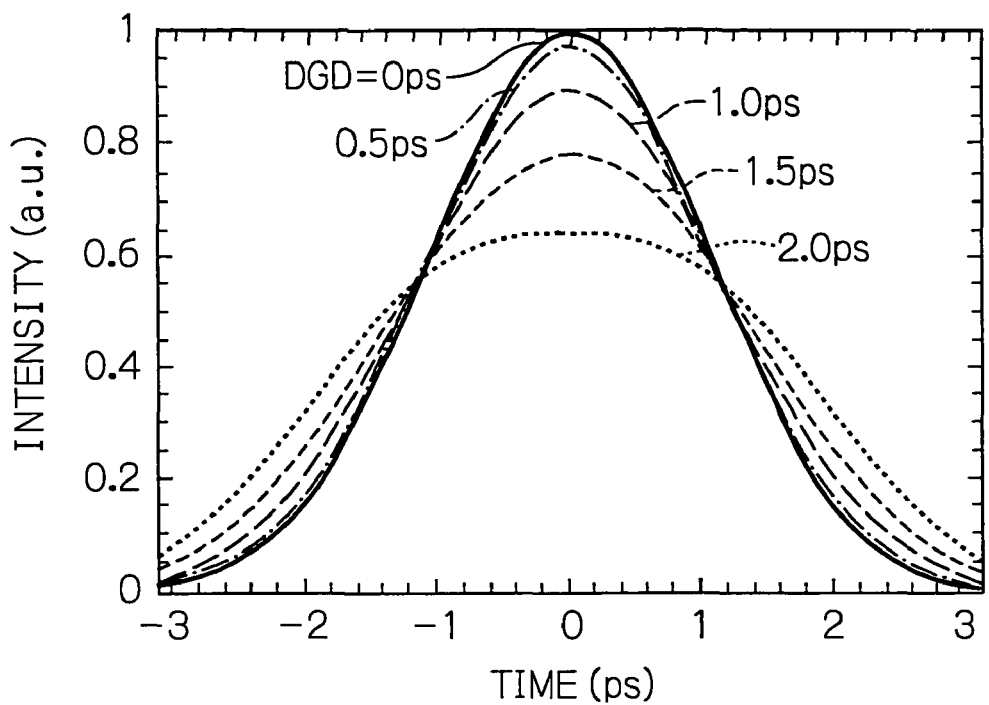
FIG. 10 plots outputs from a polarizer in the third embodiment with respect to the DGDs to show the impulse waveform of the outputs when the polarizer has its polarization axis inclining by an angle of 45 degrees with respect to the xi ($\xi$) axis.

In contrast, when the polarization axis of the polarizer 201 is at an angle of 45 degrees to the $\xi$ axis, the monitoring device 203 detects a pulse shape that is distorted by the DGD as shown in FIG. 10. In the figure, it is assumed that the pulse is Gaussian without chirp and has a pulse width of 2.5 ps for no DGD.

Figure 11:
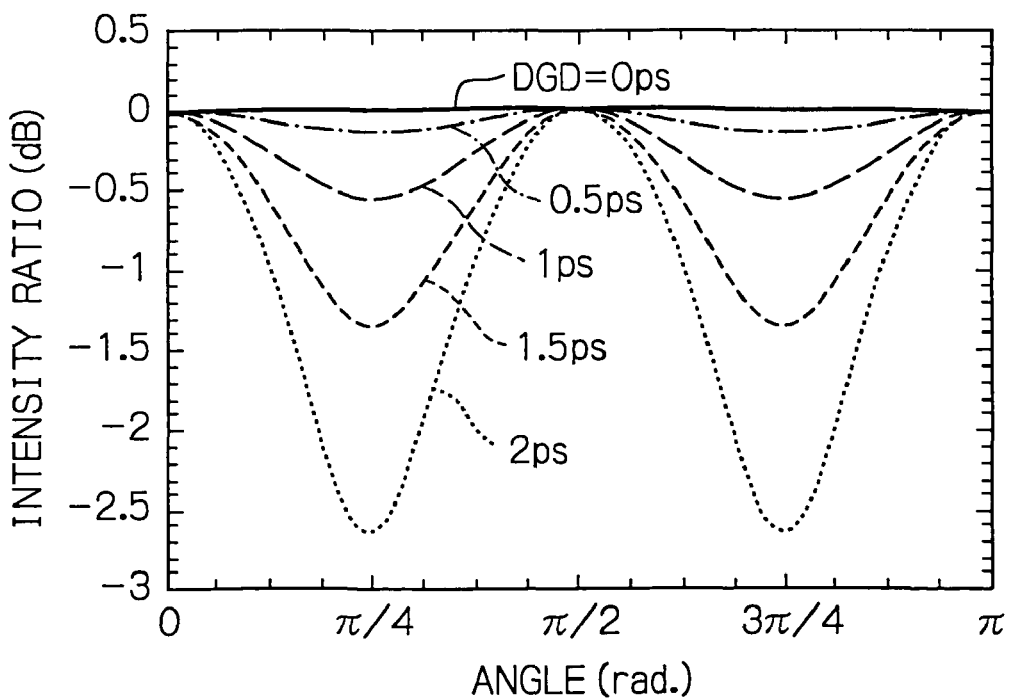
FIG. 11 is a graph plotting curves showing the relationship between the angle of the polarization axis of the polarizer and the detected intensity of the monitor per se with respect to the DGDs in the third embodiment.

When the polarizer 201 rotates, the monitoring device 203 detects different pulse widths depending on the angle between the polarization axis and the $\xi$ axis. This thus causes the difference of the signal intensity, between the division signals a/b from the dividers 120 and 121, as shown in FIG. 11. Because the intensity difference depends on the DGD, the waveform distortion caused by the DGD may be detected by observing the intensity difference. As seen in FIG. 11, for example, when the intensity difference is within range from 0 dB to −2.5 dB, the DGD is 2 ps.

Figure 12:
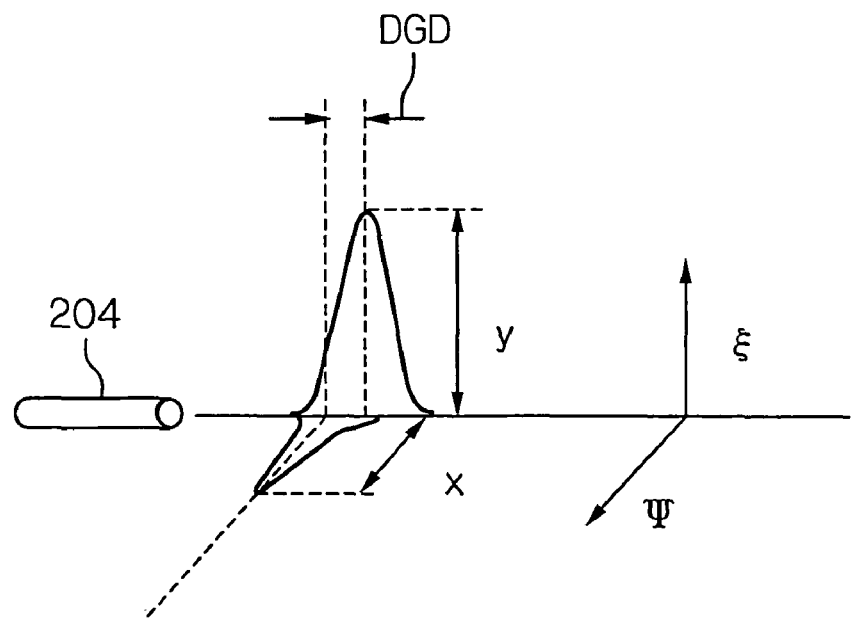
FIG. 12 explanatorily shows an example of DGD in the third embodiment different in intensity between the $\xi$ and psi ($\psi$) axes.
Figure 13:
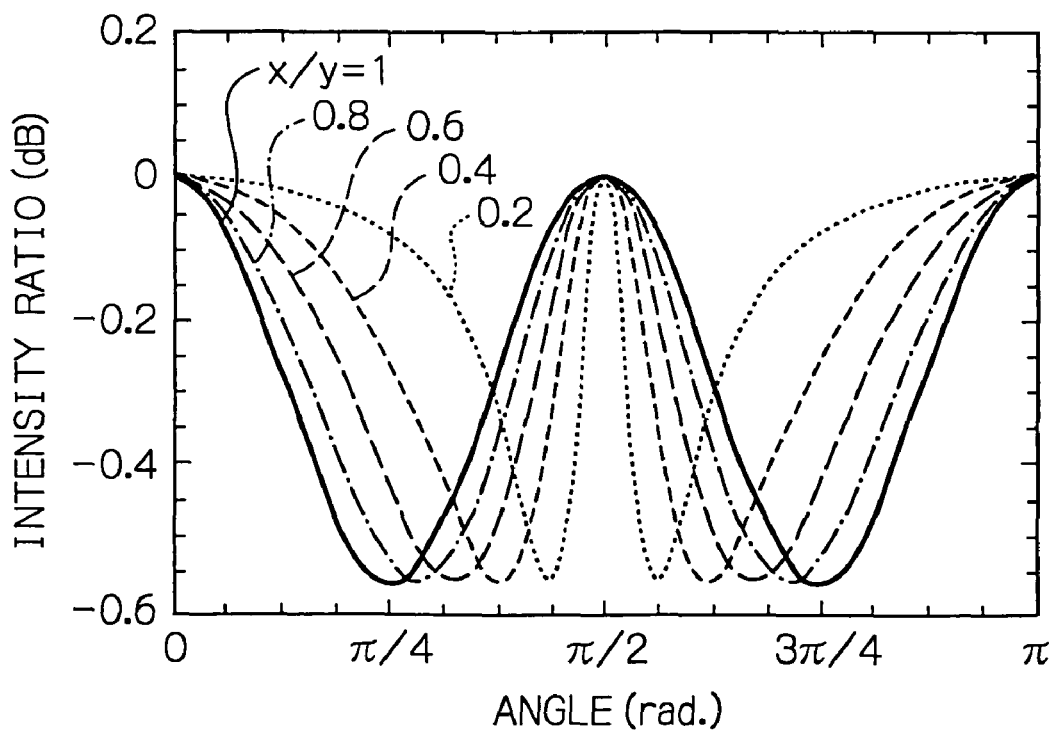
FIG. 13 is a graph plotting curves showing the relationship between the polarizer angle and an intensity ratio of the $\xi$ axis to the $\psi$ axis for a predetermined value of the DGD in the third embodiment.

FIG. 11 plots the characteristic curves of the intensity ratio when the waveform is distorted by the DGD for the intensity ratio between the $\xi$ axis and the $\psi$ axis of 1:1. Actually, however, the intensities are often different between the $\xi$ axis and the $\psi$ axis. FIG. 13 plots characteristic curves of the intensity ratio x/y for the DGD of 1 ps in relation to the angle of the polarizer 201, where y and x respectively denote the intensities on the $\xi$ axis and the $\psi$ axis, as shown in FIG. 12. According to FIG. 13, it may be seen that the intensity variation is caused depending on the angle of the polarizer 201 even when the intensity ratio x/y is not equal to unity.

Figure 14:
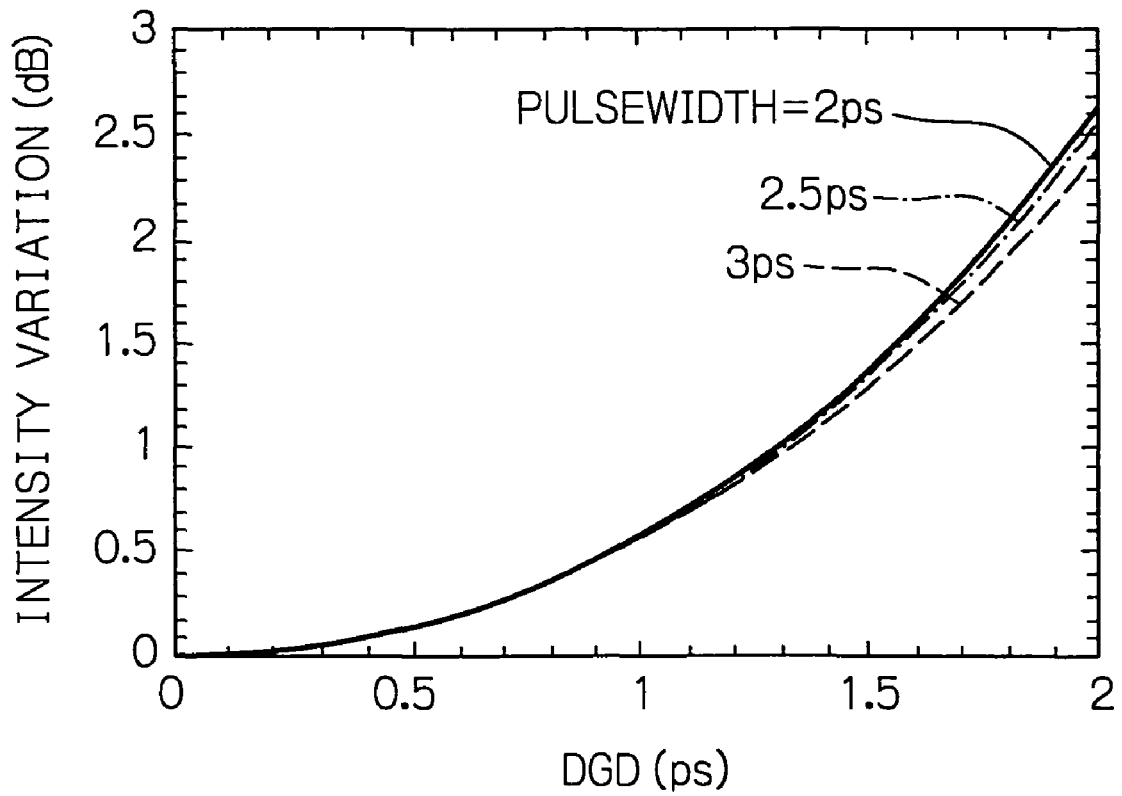
FIG. 14 plots curves of intensity difference (variation) with respect to the DGD in the third embodiment.

FIG. 14 a graph plotting intensity difference (variation) with respect to the DGD to show a characteristic curve of the intensity. The intensity difference may be detected to monitor the waveform distortion caused by the DGD.

The monitoring device 203 receives the oscillation signal from the oscillator 202 as the angle information of the polarizer 201 so as to refer to the angle information as appropriate depending on the monitored subject.

In addition to above-mentioned case depending on the DGD, for example, in case where the first and second line division signals may be incorporated and be processed when the angle of the polarizer is an integral multiple of $\pi/2$, it is possible to detect the OSNR as the first and second embodiments. Moreover, the maximum intensity may also be used to detect the OSNR and chromatic dispersion.

In a method for detecting the waveform distortion caused by the DGD, at least, the target optical transmission system is observed in advance to store information thereon or observing information of the reference system is stored in advance, and the stored information is compared with the current observation of the system so as to obtain the observation of the desired characteristics. Alternatively, in the method, the reference information may be displayed and the observation may be overlapped on the displayed image, thereby facilitating the observer's understanding of the observation.

Thus, the third embodiment may monitor the waveform distortion caused by the DGD as the optical signal quality. The OSNR and chromatic dispersion of the optical signal may also be monitored at the same time.

Although the above embodiments use the Gaussian pulses without chirp that form a short pulse train with a repetition frequency of 160 GHz as the input signal, in other embodiments, modulated signals or other pulse shapes may also be used. The low frequency $\Delta f$ may not be limited to 1 GHz.

With respect to the optical signal quality monitor of the present invention, the first embodiment is specifically featured by the two-line monitoring configuration. However, the two-line monitoring configuration is not essential for the monitor and one-line or three or more line monitoring configuration may be used. For instance, only one line may be used to monitor the desired characteristics. Alternatively, third-line may be added and a monitoring section may be arranged in the third-line. In the third-line, an amount of the superimposed noise (level) differs from that in the second line or the 3 dB band width $\Delta f$ differs from that of the optical band-pass filter in the second line.

The configurations of the second lines in the first and second embodiments may be mixed in the same optical signal quality monitoring device.

The third embodiment is specifically featured in that the polarization state of the input optical signal is varied by the rotational polarizer. Alternatively, an optical element exerting the electro-optical effect or the magneto-optical effect may be used to vary the polarization state of the input optical signal. Alternatively, the input optical signal may be split into two signals, and be passed through a plurality of polarizers having different polarization angles, and then be input to monitoring sections in lines corresponding to the respective polarizers.

Furthermore, in the optical signal quality monitor of the present invention, the elements dealing with electric signals and those dealing with optical signals may be changed or modified from those described in the above embodiments to any elements that may exert the essential functions of the present invention. For example, the functions of the electrical BPFs 212 and 213 and LPFs 218 and 219 in the first embodiment may be exerted by optical devices.

The entire disclosure of Japanese patent application No. 2007-184608 filed on Jul. 13, 2007, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An optical signal quality monitor comprising:
   a splitter for splitting an input optical signal into two split signals, the input optical signal having an input optical signal frequency;

a converter for producing a converted signal, the converter including an electro-absorption (EA) modulator that modulates one of the split optical signals based on a signal determined by adding a predetermined offset frequency to 1/N of the frequency of the input optical signal (where N is a natural number), the converted signal having a frequency that is N times the offset frequency;

a low-frequency photoelectric converter for changing the converted signal into an electrical signal and limiting it to a predetermined bandwidth to provide a bandwidth-limited electrical signal;

a reference signal generator for generating an electrical reference signal, the reference signal converter either converting the other split optical signal into an electrical signal and filtering low-frequency components from it to form the electrical reference signal or filtering low-frequency components from the other split optical signal and converting the filtered signal into the electrical reference signal;

an intensity ratio calculator for calculating an intensity ratio of the bandwidth-limited electrical signal to the electrical reference signal; and a quality monitoring section for monitoring the intensity ratio together with pre-stored characteristic information or checking the intensity ratio against the characteristic information to obtain a quality parameter of the input optical signal.

2. The optical signal quality monitor according to claim 1, wherein said splitter, said converter, said low-frequency photoelectric converter, said reference signal generator, and said intensity ratio calculator form one processing portion, wherein said optical signal quality monitor further comprises:
an additional splitter that splits the input optical signal into two additional split signals;
an additional converter that converts one of the additional split optical signals to an additional converted signal by modulating the additional split optical signal with a frequency offset signal; and
an additional intensity ratio calculator that calculates an intensity ratio between the additional converted signal from said additional converter and the other additional split optical signals as a reference, wherein said additional splitter, said additional converter, and said additional intensity ratio calculator form another processing portion, and wherein the second processing portion further comprises an optical noise superimposer that superimposes optical noise on the additional split optical signal before it is inputted to said additional low-frequency converter.

3. The optical signal quality monitor according to claim 1, wherein said splitter, said converter, said low-frequency photoelectric converter, said reference signal generator, and said intensity ratio calculator form one processing portion, wherein said optical signal monitor further comprises:
an additional splitter that splits the input optical signal into two additional split signals;
an additional converter that converts one of the additional split optical signals to an additional converted signal by modulating the additional split optical signal with a frequency offset signal; and
an additional intensity ratio calculator that calculates an intensity ratio between the additional converted signal from said additional converter and the other additional split optical signals as a reference, wherein said additional splitter, said additional converter, and said additional intensity ratio calculator forming another processing portion, and wherein the another processing portion further comprises an optical band-pass filter that transmits the additional split optical signal before it is inputted to said converter.

4. The optical signal quality monitor according to claim 1, further comprising a polarization state changer that changes a polarization state of the input optical signal before it is inputted to said splitter.

5. The optical signal quality monitor according to claim 4, wherein said polarization state changer changes the polarization state of the input optical signal at regular intervals.

6. The optical signal quality monitor according to claim 5, wherein said polarization state changer comprises a polarizer for changing the polarization state.

7. The optical signal quality monitor according to claim 5, wherein said polarization state changer comprises an optical element exerting an electro-optical effect to change the polarization state.

* * * * *